United States Patent [19]

Ward

[11] 4,204,456
[45] May 27, 1980

[54] PNEUMATIC EJECTOR FOR BOMB

[75] Inventor: Frederick D. Ward, St-Foy, Canada

[73] Assignee: Her Majesty the Queen in right of Canada, as represented by the Minister of National Defence, Canada

[21] Appl. No.: 947,525

[22] Filed: Oct. 2, 1978

[30] Foreign Application Priority Data

Nov. 16, 1977 [CA] Canada .................................. 290983

[51] Int. Cl.² ........................... B64D 1/04; F41F 5/02
[52] U.S. Cl. ..................................... 89/1.5 G; 91/47;
92/162 R; 294/83 AA; 294/88
[58] Field of Search ............... 89/1.5 G, 1.5 R, 1.5 F;
294/88, 83 AA, 83 AB, 83 R, 83 A; 244/137 R;
114/271; 92/162 R; 91/47, 417 R

[56] References Cited

U.S. PATENT DOCUMENTS

| 513,601 | 1/1894 | Teal ........................................... 91/47 |
| 2,852,982 | 9/1958 | Musser ................................. 89/1.5 G |
| 3,058,450 | 10/1962 | Lissau ................................ 92/162 R |
| 3,242,666 | 3/1966 | Peterson ........................... 89/1.5 R X |
| 3,242,808 | 3/1966 | Nelson et al. ....................... 89/1.5 R |
| 3,757,640 | 9/1973 | Karol ............................... 91/417 R X |
| 3,877,343 | 4/1975 | Newell et al. ................... 89/1.5 G X |

*Primary Examiner*—David H. Brown
*Attorney, Agent, or Firm*—Stevens, Davis, Miller & Mosher

[57] ABSTRACT

A pneumatic ejector device suitable for use in an aerial bomb ejection system, in which pivotably operable jaws for gripping the bomb or other device are operatively interconnected to a pneumatically operated piston which engages with the bomb to effect positive release. The piston is contained within a gas tight cylinder and a radial clearance is provided therebetween to allow for gas leakage to both sides of the piston. The piston is locked in the loaded position by means of a spring and ball detent and is "armed" by charging air or other gas under pressure into the cylinder. Ejection is achieved by releasing gas pressure from the lower side of the piston at a rate in excess of the rate of leakage past the piston, by means of a solenoid controlled release valve.

7 Claims, 2 Drawing Figures

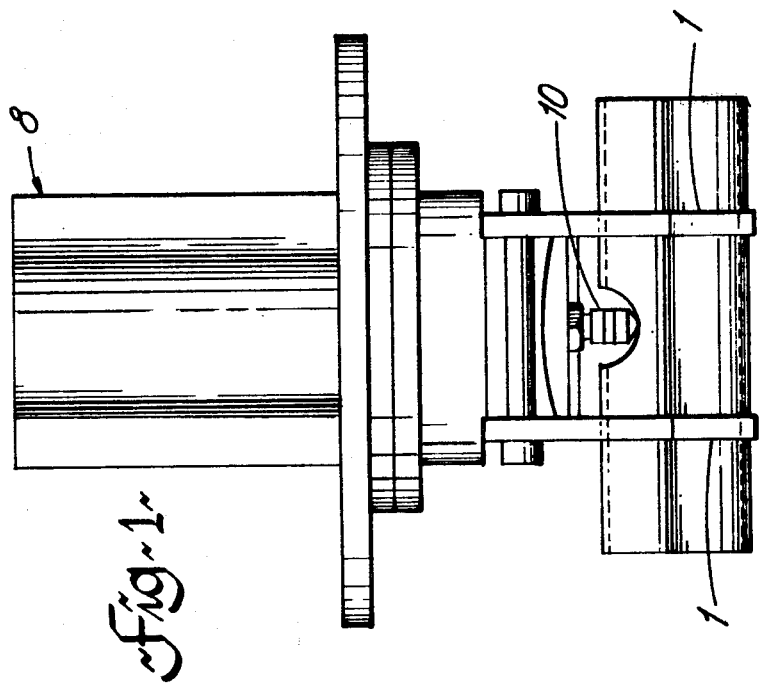
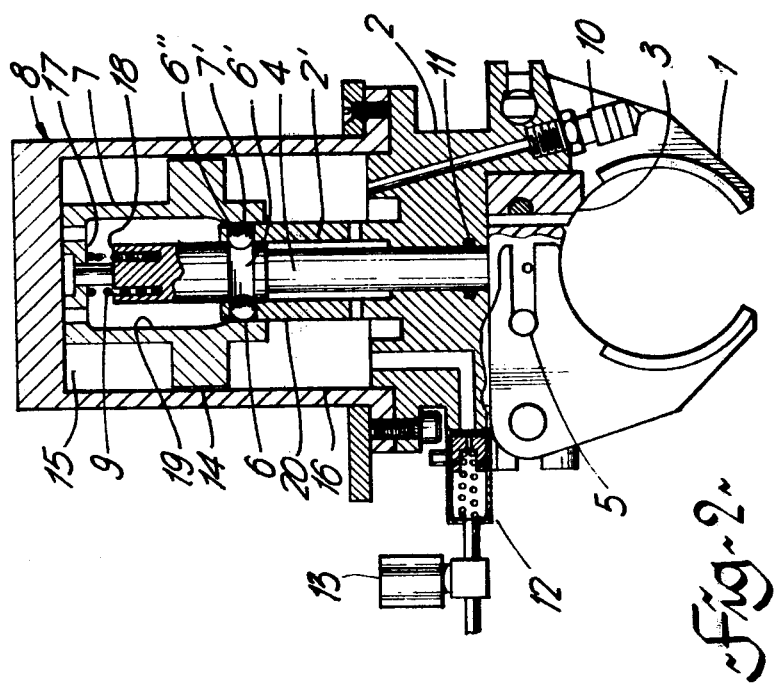

PNEUMATIC EJECTOR FOR BOMB

This invention releates to a quick release of ejector system and more particularly to a pneumatic bomb ejector system for use in an aircraft and which imparts sufficient initial velocity to the bomb to clear the aircraft structure.

Although this specification is directed primarily to an airborne bomb ejector system, it is to be understood that the invention is not limited thereto and the ejector system may be employed in many other environments including, but not exclusively, logging operations and mechanical handling operations of many types including remote handling operations.

In an airborne bomb ejector system it is a requirement that the bomb, upon release, shall have an initial velocity imparted to it of sufficient magnitude so as to clear the aircraft structure. The mechanism required must be simple to reload and require minimal maintenance. It is also highly desirable that the system should be "fail-safe", i.e. there should be no possibility of premature operation.

Generally, the ejectors of the prior art include the use of either a gas generator to operate a piston-ejection mechanism, or the energy stored in a precompressed spring which is released by actuation of a solenoid. Such devices are not without their disadvantages. Firstly, there are logistic disadvantages pertaining to the gas-generator system because potentially dangerous stores must be supplied and kept in a safe place, and secondly the cartridges themselves are relatively costly. Preloading of springs has been found to be a frequently difficult and sometimes hazardous operation.

It is, therefore, an object of the present invention to overcome the inherent disadvantages of the prior art and to provide a relatively simple, pneumatic ejection mechanism.

Thus, by one aspect of this invention there is provided a mechanism for use in an ejector system comprising:

(a) a housing;

(b) piston means mounted for longitudinal movement in said housing and dividing the same into two chambers having a gas leakage space therebetween;

(c) means to inject a pressurized gas into said chambers;

(d) means to exhaust said gas from one of said chambers at a rate in excess of the rate of gas leakage between said chambers, to thereby effect longitudinal movement of said piston means through said one chamber; and (e) actuator means in said housing for movement between a first position within said housing and a second position extending therefrom in response to an operative pressure applied thereto by said piston means during said longitudinal movement thereof.

The invention will be described in more detail hereinafter by reference to the drawings in which:

FIG. 1 is a front elevational view of one embodiment of the device of the present invention; and FIG. 2 is a side elevational view, partly in section, of the device of FIG. 1.

As shown in FIGS. 1 and 2, a bomb (not shown) is supported in a pair of claws 1 which are pivotally mounted on a central fixed body 2. In contact with the bomb, and adapted to register with a recess in the upper surface thereof, is a central thrust pad 3 forming the lower extremity of a central shaft 4 which is slidable in fixed body 2. Thrust pad 3 is provided with a pair of opposed laterally extending rods 5 which engage and ride in respective slots in each of said claws 1 so as to cause the claws to open and release the bomb when the central shaft moves downwardly relative to the fixed body 2.

The shaft 4 is normally locked in its upper position relative to body 2 by means of a set of steel balls 6 which are contained in a circumferential groove 6' in the shaft 4 and corresponding holes 6" in a tubular extension 2' of the central body 2. The balls are retained radially by the inner diameter 7' of a piston 7 which rides on the tubular extension 2' and is contained within an outer cylindrical housing 8. Piston 7 is held in the locked upper position by means of a compression spring 9 acting between piston 7 and shaft 4.

A small radial clearance 14 is provided between the piston 7 and the housing 8, so that gas may flow slowly between the spaces 15 and 16 above and below the piston 7 respectively. A suitable gas, such as air or nitrogen, is introduced into space 16 by means of a charging valve 10 mounted in body 2 and in a relatively short time the pressures on either side of piston 7 are equal. Leakage of the gas out of the spaces 15 and 16 is prevented by an "O" ring seal 11, or other means such as a rolling diaphragm zero-leak seal.

In order to effect ejection of the bomb, the pressurized gas in space 16 must be exhausted at a rate greater than the rate of leakage around piston 7. In the embodiment shown, this may be effected by means of a large bore servo valve 12 controlled by a small solenoid valve 13. The pressure differential across the piston 7 forces it downwardly against spring 9 until the underface 17 thereof contacts the top surface 18 of the movable central shaft 4. The balls 6 can then roll out into the annular space formed between inner wall 19 of the piston 7 and the outer wall 20 of the body extension 2', thus allowing the piston 7 and shaft 4 to move downwardly, relative to fixed body 2, thus forcing the bomb out while the jaws are opening.

Reloading may be effected by manually or otherwise closing the jaws around the bomb or other article to be gripped and held, thus forcing the piston 7 and shaft 4 upwardly until the balls 6 roll back through the holes 6" in extension 2' and into groove 6', thereby locking the entire assembly.

As will be appreciated, the system can be "armed", by introduction of the pressurized gas through charging valve 10, either at the time of loading or subsequently thereto. Any number of ejectors may share a common pressurizing line so that no operation would take place until armed either separately or simultaneously by operation of one or more valves controllable by the aircraft pilot or other operator, to thus deliver pneumatic pressure from a suitably located storage container.

It will also be appreciated that, for any given assembly, the ejection velocity is a function of the charging gas pressure and can therefore be readily adjusted within the design limits as required for specific operations.

Operation of valve 13 requires very little electrical energy and the time delay between actuation thereof and ejection is very small. Premature ejection would require either premature operation of the valve 13 or a rapid gas leakage from space 16, either of which contigencies is extremely unlikely and the likelihood of which can, in fact, be further reduced by delaying the arming of the device until shortly before operational use. Slow leakage of gas from either of spaces 15 or 16 is not hazardous as this would merely render the system inoperative.

As has been pointed out hereinabove the present invention has been described with respect to an aerial bomb ejection mechanism, but as will be readily apparent the principles thereof are equally applicable to many other materials handling situations requiring a hold and quick release capability and the scope of the present invention is defined only by the scope of the claims appended hereto.

The embodiments of the invention in which an exclusive property or privilege is claimed are defined as follows:

1. A mechanism for use in an ejector system comprising:
   (a) a housing;
   (b) piston means mounted for longitudinal movement in said housing and dividing the same into two chambers having a gas leakage space therebetween;
   (c) means to inject a pressurized gas into said chambers;
   (d) means to exhaust said gas from one of said chambers at a rate in excess of the rate of gas leakage between said chambers, to thereby effect longitudinal movement of said piston means through said one chamber;
   (e) actuator means in said housing for movement between a first position within said housing and a second position extending therefrom in response to an operative pressure applied thereto by said piston means during said longitudinal movement thereof; and,
   (f) lock means to releasably secure said actuator means in said first position in association with said piston means which is adjacent one end of said housing.

2. A valve mechanism as claimed in claim 1 wherein said lock means includes spring means between said piston means and said actuator means for maintaining said piston means adjacent said one end of said housing.

3. A valve mechanism as claimed in claim 1 or 2 including jaw means mounted on said housing and actuated for movement between a gripping and a release position by said actuator means.

4. A quick release mechanism comprising:
   (a) a body member;
   (b) gripping means mounted on said body member for movement between a first, gripping, position and a second, release, position;
   (c) shaft means mounted in said body member and interconnected to said gripping means for effecting said movement;
   (d) housing means secured to said body means thereby forming a substantially gas tight chamber therewith;
   (e) piston means mounted for sliding movement in said housing means with sufficient radial clearance to allow limited gas flow therebetween;
   (f) means releasably locking said shaft means and said body member when said gripping means are in said first position;
   (g) means for charging a gas under pressure into said chamber; and
   (h) means for exhausting said gas from said chamber on one side of said piston means at a rate greater than said limited gas flow around said piston means thereby allowing said piston means to (i) move relative to said housing means and said body member, (ii) release said locking means, (iii) engage with said shaft means, and (iv) continue movement therewith to thereby move said gripping means to said second position.

5. A quick release mechanism as claimed in claim 4 wherein said locking means comprises a plurality of ball means in a plurality of holes in said body member for engaging a circumferential groove in said shaft means and being radially outwardly restrained by said piston means.

6. A quick release mechanism as claimed in claim 5 wherein said locking means includes resilient means between said shaft means and said piston means for resiliently urging said piston means away from said shaft means when said shaft means is in said first position relative to said body member.

7. Apparatus as claimed in claim 4 or 5 wherein said means to exhaust said gas comprises a solenoid operated servo-valve.

* * * * *